(12) United States Patent
Chen et al.

(10) Patent No.: US 8,217,771 B2
(45) Date of Patent: Jul. 10, 2012

(54) METHOD AND SYSTEM FOR DETERMINING DEVIATION OF DYNAMIC LOCATION

(75) Inventors: Pin-Yung Chen, Hsinchu (TW); Ya-Wen Shih, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 592 days.

(21) Appl. No.: 12/505,625

(22) Filed: Jul. 20, 2009

(65) Prior Publication Data

US 2010/0259370 A1     Oct. 14, 2010

(30) Foreign Application Priority Data

Apr. 9, 2009 (TW) ................................ 98111895 A
May 11, 2009 (TW) ................................ 98115601 A

(51) Int. Cl.
*B60Q 1/00*     (2006.01)

(52) U.S. Cl. .................... 340/425.5; 340/539.13; 701/1; 342/357.25

(58) Field of Classification Search ............... 340/425.5, 340/539.13, 539.1, 539.15, 539.23; 701/400, 701/408, 1, 23, 24; 342/357.34, 357.25
See application file for complete search history.

(56) References Cited

U.S. PATENT DOCUMENTS

| 7,136,747 | B2 | 11/2006 | Raney |
| 7,613,563 | B2 | 11/2009 | Haegebarth et al. |
| 8,115,625 | B2 * | 2/2012 | Yoshioka et al. ........ 340/539.15 |
| 2004/0193372 | A1 * | 9/2004 | MacNeille et al. ........... 701/213 |

FOREIGN PATENT DOCUMENTS

| CN | 1804551 | 7/2006 |
| TW | I300203 | 2/2007 |
| TW | I290619 | 12/2007 |
| WO | WO 2004/077378 | 9/2004 |

OTHER PUBLICATIONS

Chinese language office action dated Jan. 12, 2012.
English language translation of abstract of CN 1804551 (published Jul. 19, 2006).

* cited by examiner

*Primary Examiner* — Toan N Pham
(74) *Attorney, Agent, or Firm* — Thomas|Kayden

(57) ABSTRACT

A method and a system of determining the deviation of dynamic position are provided. The determining method includes the follow steps. First, a server receives a plurality of first position data from a first mobile device. Next, the server receives a plurality of second position data from a second mobile device. Then, the server transmits the first position data to the second mobile device. Thereon, the server transmits the second position data to the first mobile device. Later, the server determines whether the first mobile device and the second mobile device deviate from each other according to the first position data and the second position data.

42 Claims, 11 Drawing Sheets

METHOD AND SYSTEM FOR DETERMINING DEVIATION OF DYNAMIC LOCATION

This application claims the benefit of Taiwan provisional application Ser. No. 98111895, filed Apr. 9, 2009, the subject matter of which is incorporated herein by reference, and claims the benefit of Taiwan application Ser. No. 98115601, filed May 11, 2009, the subject matter of which is incorporated herein by reference.

BACKGROUND OF THE INVENTION

1. Field of the Invention

The invention relates in general to a method and a system for determining deviation of dynamic location, and more particularly to a method and a system for determining deviation of dynamic locations of several mobile devices.

2. Description of the Related Art

As technology develops, the current location can be obtained by global positioning system (GPS) receiver. GPS is widely applied to people's daily activities, such as operating vehicle, mountain climbing, meteorology research or geography research. Take operating vehicle for example. The global positioning system along with the geographic information system (GIS) provides the current location and the route for the driver operating the vehicle.

Although the GPS navigator is widely applied to vehicles, such as automobiles, airplanes or ships, it can only position or guide a single vehicle. When several vehicles travelling together, each vehicle cannot know the locations of other vehicles. Therefore, other communication devices, such as mobile phones, are needed for requesting the locations of other vehicles, which is quite inconvenient. Also, the location might not be able to be described correctly.

Furthermore, the technology of combining global positioning system to report the traffic and calculate the route accordingly is developed now. For example, after a vehicle transmits its location data to a server through the global positioning system, the server transmits the traffic condition around the location to the vehicle, so that the vehicle calculates other routes accordingly.

Moreover, the route calculation of the navigation module nowadays is mostly for a single vehicle travelling to a destination. For example, when the vehicle gets lost, the navigation module starts to calculate the route from the location of the vehicle to the destination. Furthermore, the current PAPAGO has the function of group leader. The group leader sends a destination to the members of the group. When receiving the location of the destination, the members set the destination manually. Accordingly, the navigation module calculates the route to the destination, and the members move to the destination from different places.

SUMMARY OF THE INVENTION

The invention is directed to a method and a system for determining deviation of dynamic location. Each mobile device gets the latest dynamic locations of other mobile devices and knows if it deviates from other mobile devices. As a result, there is no need to use other communication devices, such as mobile phones, to tell others its location, which is really convenient.

According to the present invention, a method for determining deviation of dynamic location is provided. The method includes following steps. First, a server receives several first location data of a first mobile device. Next, the server receives several second location data of a second mobile device. Then, the server transmits the first location data to the second mobile device. Subsequently, the server transmits the second location data to the first mobile device. Thereon, it is determined if the first mobile device and the second mobile device deviate from each other according to the first location data and the second location data.

According to the present invention, a system for determining deviation of dynamic location is provided. The determining system includes a server, a first mobile device and a second mobile device. The server includes a server wireless communication module and a server process unit. The first mobile device includes a first wireless communication module and a first process unit. The first wireless communication module is used for transmitting several first location data to the server wireless communication module. The second mobile device includes a second wireless communication module and a second process unit. The second wireless communication module is used for transmitting several second location data to the server wireless communication module. The server wireless communication module is used for transmitting the received first location data to the second mobile device and transmitting the received second location data to the first mobile device. At least one of the server process unit, the first process unit and the second process unit is used for determining if the first mobile device and the second mobile device deviate from each other according to the first location data and the second location data.

The invention will become apparent from the following detailed description of the preferred but non-limiting embodiments. The following description is made with reference to the accompanying drawings.

DETAILED DESCRIPTION OF THE INVENTION

Figure 1:
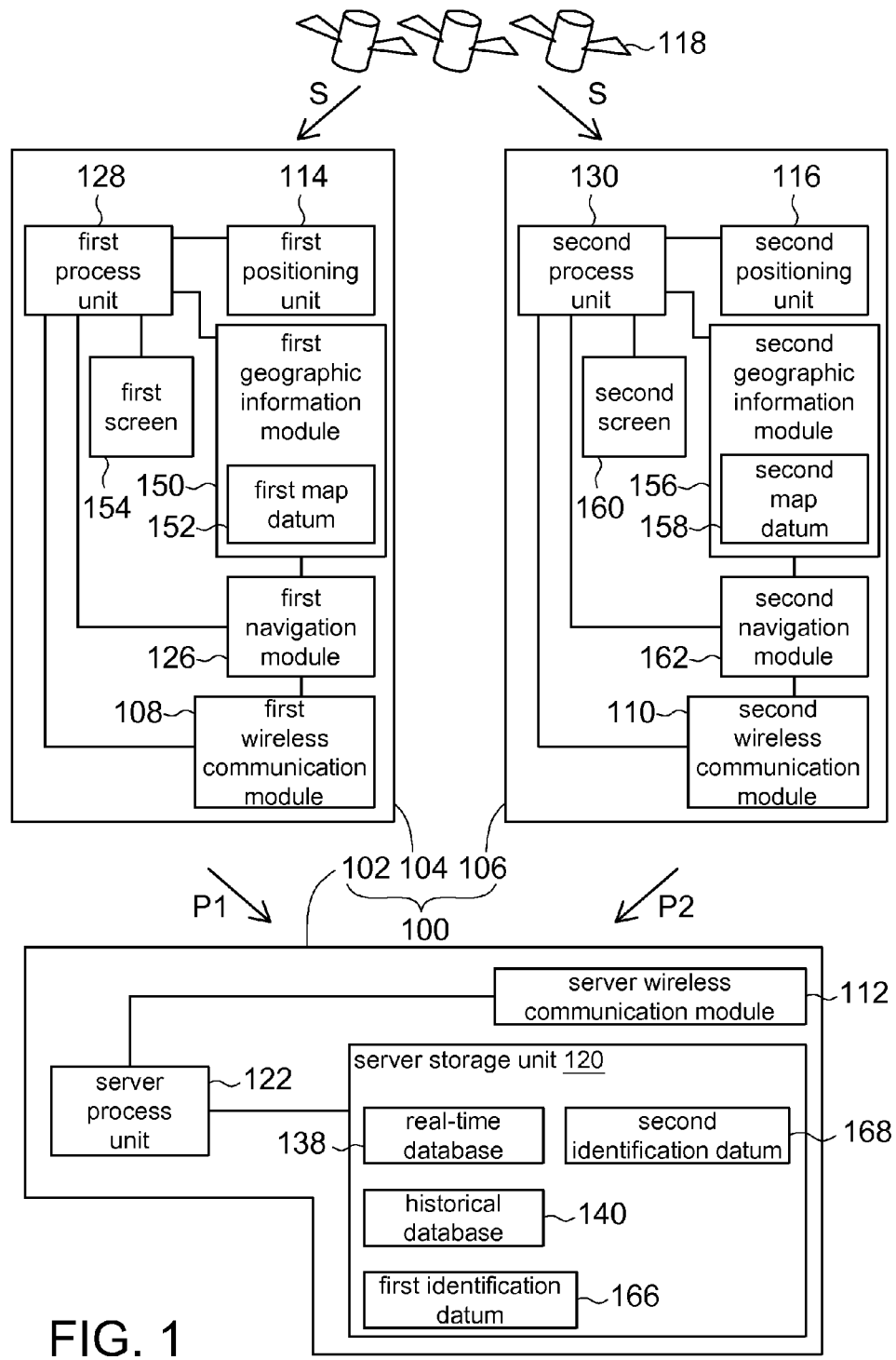
FIG. 1 shows a function block diagram of a determining system for deviation of dynamic location.

The present invention relates to a method and a system for determining deviation of dynamic location. Each mobile device transmits its location to a server. Then, the server transmits all the locations to each mobile device. As a result, each mobile device is able to get the latest location of all other mobile devices.

Preferred embodiments are provided as follows for illustrating the present invention. However, the content provided by the embodiments is described as an example with reference to the accompanying drawings. Therefore, the present invention is not limited thereto. Furthermore, unnecessary components are not shown in the drawings of the embodiment for clarity.

First Embodiment

Please refer to FIG. 1, which shows a function block diagram of a system for determining deviation of dynamic location. The determining system 100 includes a first mobile device 104, a second mobile device 106 and a server 102. The first mobile device 104 and the second mobile device 106 are respectively disposed in the first vehicle C1 (shown in FIG. 2) and the second vehicle C2 (shown in FIG. 2) as an example. However, the present invention is not limited thereto. The first mobile device 104 and the second mobile device 106 can be applied to other transportation means, such as bicycles, motorcycles, airplanes or ships.

The first mobile device 104 includes a first wireless communication module 108, a first process unit 128, a first positioning unit 114, a first navigation module 126, a first geographic information module 150 and a first screen 154. The first positioning unit 114 is used for calculating several first location data P1 according to the signals S of several positioning devices 118, such as the global positioning system (GPS) satellites. The first location data P1 are the longitude and latitude or the altitude of the geographic location of the first mobile device 104 at different time points. When the first positioning unit 114 calculates a first location datum P1, the first location datum P1 is transmitted to the server 102 by the first wireless communication module 108 immediately. Moreover, the positioning devices 118 can be several wireless communication base stations applying cell-ID positioning technology.

The second mobile device 106 includes a second wireless communication module 110, a second process unit 130, a second positioning unit 116, a second navigation module 162, a second geographic information module 156 and a second screen 160. The second positioning unit 116 is used for calculating several second location data P2 according to the signals S of the positioning device 118. The second location data P2 are the longitude and latitude or the altitude of the geographic location of the second mobile device 106 at different time points. When the second positioning unit 116 calculates a second location datum P2, the second location datum P2 is transmitted to the server 102 by the second wireless communication module 110 immediately.

The first wireless communication module 108 and the second wireless communication module 110 can be Wifi, MIMO, WiMAX, GPRS(2.5G), WCDMA(3G), CDMA2000 (3G), WCDMA+HSDPA(3.5G), WCDMA+HSDPA+ HSUPA(3.75G), 3G(LTE) or other wireless communication modules. The first wireless communication module 108 and the second wireless communication module 110 of the present embodiment are 3G wireless communication module as an example.

The server 102 includes a server wireless communication module 112, a server process unit 122 and a server storage unit 120. The server storage unit 120 stores a real-time database 138, a historical database 140 and a first identification datum 166 of the first mobile device 104 and a second identification datum 168 the second mobile device 106. For example, the first identification datum 166 is the name of the driver of the first vehicle C1, and the second identification datum 168 is the name of the driver of the second vehicle C2. The server wireless communication module 112 is used for receiving the first location data P1 transmitted from the first wireless communication module 108 and the second location data P2 transmitted from the second wireless communication module 110. The server wireless communication module 112 further transmits the received second location data P2 and the second identification datum 168 to the first wireless communication module 108 and transmits the received first location data P1 and the first identification data 166 to the second wireless communication module 110. Of course, anyone who has ordinary skill in the field of the present invention can understand that the server wireless communication module 112 can transmit all the received location data, that is the first location data P1 and the second location data P2, and all the identification data, to each mobile device. The identification data includes the first identification datum 166 and the second identification datum 168. The mobile devices include the first mobile device 104 and the second mobile device 106.

As stated above, each mobile device has its own location data and gets the latest location data of other mobile devices from the server 102. Therefore, each mobile device is able to get the latest location data of all the mobile devices in order to know the latest dynamic locations of all the mobile devices.

Figure 2:
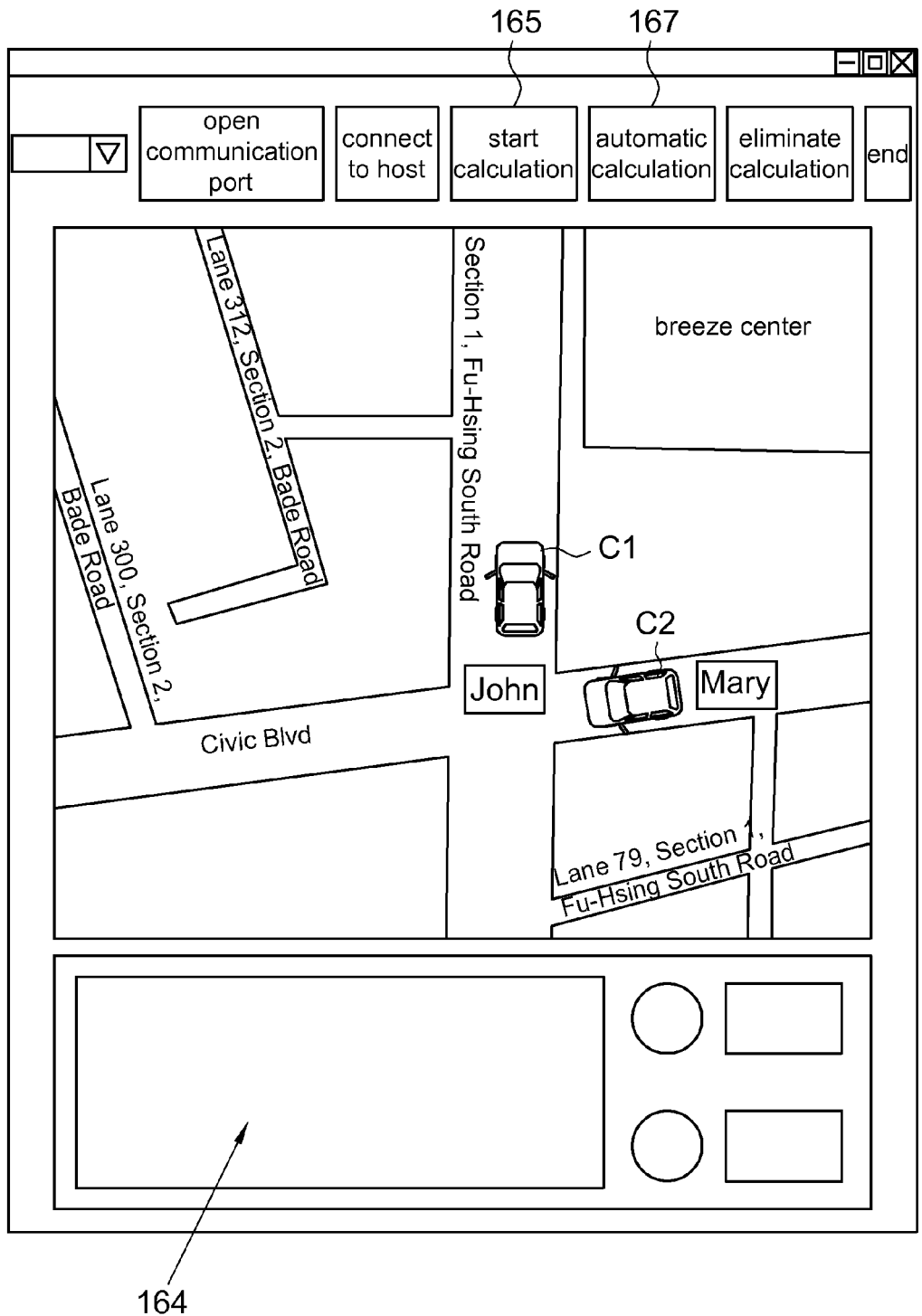
FIG. 2 illustrates the first location data and the second location data displayed at the same time according to the present embodiment.

FIG. 2 illustrates the first location data P1 and the second location data P2 displayed at the same time according to the present embodiment. Please refer to FIG. 2. After the first wireless communication module 108 receives the second location data P2 transmitted from the server wireless communication module 112, the first geographic information module 150 provides a first map datum 152 (the first map datum 152 shown in FIG. 1). Also, the first process unit 128 opens the first map datum 152 and a message window 164. The first process unit 128 displays the first map datum 152 and the message window 164 on the first screen 154 (the first screen 154 shown in FIG. 1). The first navigation module 126 shows the locations of the latest first location data P1 and second location data P2 on the first map datum 152. As a result, the driver of the first vehicle C1 is able to know the latest locations of all the vehicles.

Please keep referring to FIG. 2. After the second wireless communication module 110 receives the first location data P1 transmitted from the server wireless communication module 112, the second geographic information module 156 provides a second map datum 158 (the second map datum 158 shown in FIG. 1). Also, the second process unit 130 opens the second map datum 158 and the message window 164 and displays them on the second screen 160 (the second screen 160 shown in FIG. 1). The second navigation module 162 positions the locations of the latest first location data P1 and second location data P2 on the second map datum 158. As a result, the driver of the second vehicle C2 is able to know the latest locations of all the vehicles.

The first mobile device 104 receives the second identification datum of the second mobile device 106 including the name of the driver of the second vehicle C2, such as Mary.

The first mobile device 104 can stores the first identification datum 166, such as the name of the driver of the first vehicle C1, John. Therefore, the first map datum 152 shows the names of the drivers of the first vehicle C1 and the second vehicle C2. Similarly, the second map data 158 can also shown the names of the drivers of the first vehicle C1 and the second vehicle C2. Accordingly, the vehicle locations of the present embodiment are real-time dynamic information. The screen always shows the latest locations of all the vehicles without additional manual operation. Therefore, it provides high level driving safety and is very convenient.

Moreover, the server wireless communication module 112 is able to determine if the time that first mobile device 104 or the second mobile device 106 is disconnected from the server 102 is longer than a predetermined time, such as 30 seconds. When the disconnecting time is longer 30 seconds, the server process unit 122 controls the server wireless communication module 112 to transmit a disconnection notice signal to the first mobile device 104 or the second mobile device 106 which is still connected to the server. Preferably, the disconnection notice signal includes the identification datum and the disconnecting time of the disconnected mobile device. For example, after the first mobile device 104 is disconnected for 30 seconds, the server wireless communication module 112 starts to transmit the disconnection notice signal, such as "John has been disconnected for 30 seconds" to the second mobile device 106. After the first mobile device 104 is disconnected for 75 seconds, the server wireless communication module 112 transmits the disconnection notice signal, such as "John has been disconnected for 75 seconds" to the second mobile device 106 for reminding the connected second mobile device 106 that other mobile devices have been disconnected.

Figure 3:
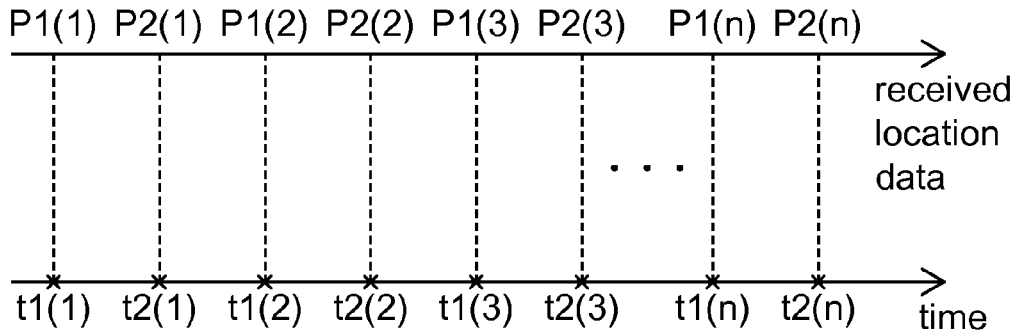
FIG. 3 illustrates the server in FIG. 1 synchronically receiving the first location data and the second location data.

Please refer to FIG. 3, which illustrates the server in FIG. 1 synchronically receiving the first location data and the second location data. The server wireless communication module 112 receives the first location data P1(n) at the time t1(n) and the second location data P2(n) at the time t2(n). The time t1(n) is very close to the time t2(n). Therefore, the first location data P1(n) and the second location data P2(n) can be considered as being synchronically received by the server wireless communication module 112. When receiving the first location data P1(n) and the second location data P2(n), the server wireless communication module 112 transmits the first location data P1(n) and the second location data P2(n) to the first wireless communication module 108 and the second wireless communication module 110. Therefore, the first wireless communication module 108 and the second wireless communication module 110 receive the first location data P1(n) and the second location data P2(n) almost synchronically. Therefore, the first screen 154 and the second screen 160 show the latest dynamic locations of the first vehicle C1 and the second vehicle C2.

The server 102 of the present embodiment collects the location data of all the mobile devices and then transmits the location data to each mobile device. As a result, each mobile device is able to know the latest dynamic locations of other mobile devices.

Although there are two mobile devices as an example in the present embodiment, the number of the mobile devices can be more than two. The present invention is not limited thereto.

Furthermore, the determining system of the present embodiment can be a car-following system. For example, the second mobile device 106 follows the first mobile device 104 to a destination. In the car-following drives, the server 102 determines if the first mobile device 104 and the second mobile device 106 deviate from each other according to the first location data P1 and the second location data P2 as described in the following paragraphs.

Figure 4:
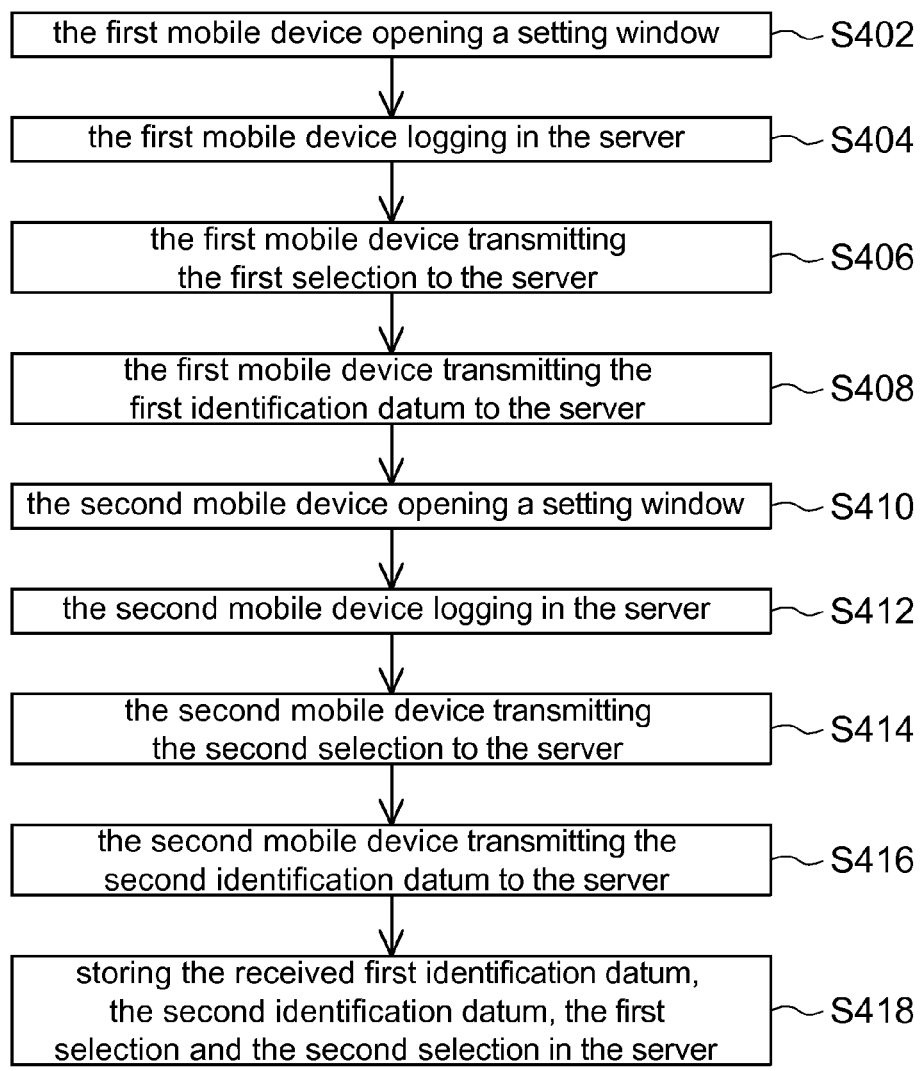
FIG. 4 shows a flow chart of setting the first mobile device and the second mobile device.
Figure 5:
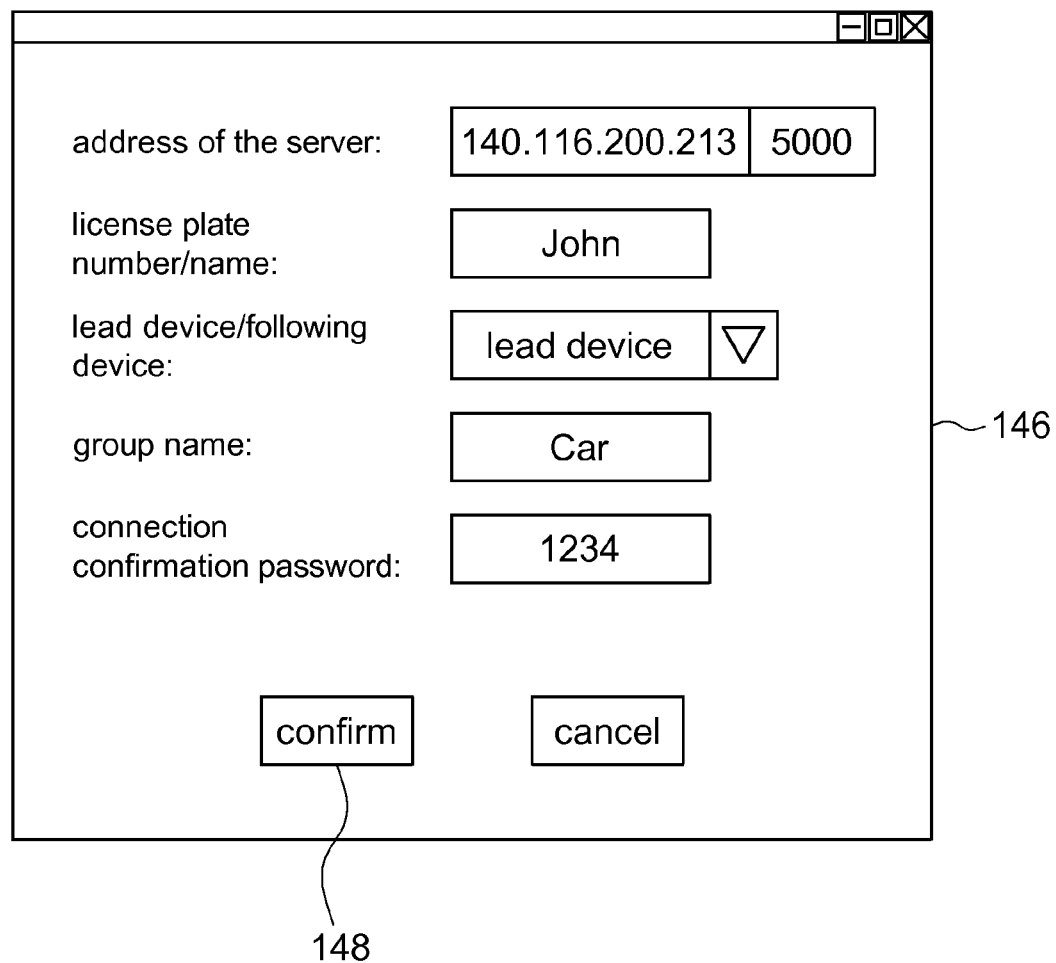
FIG. 5 illustrates a setting window of the present embodiment.

Please refer to FIG. 4, which shows a flow chart of setting the first mobile device and the second mobile device. Please also refer to FIG. 5, which illustrates a setting window of the present embodiment. In the step S402, the first process unit 128 of the first mobile device 104 opens a setting window 146. The setting window 146 provides the server address, the options of the lead device/following device, the connection password and the first identification datum 166, such as the license plate number of the first vehicle C1, the name of the driver of the first vehicle C1, the group name, the identification name and the identification number of the driver (not shown in the drawings) of the first vehicle C1. The first mobile device 104 leads other mobile devices in the caravan. Therefore, a user, such as the driver of the first vehicle C1, John, sets the first mobile device 104 as the lead device.

Next, in the step S404, after the user presses the confirm button 148, the first mobile device 104 logs in the server 102.

Then, in the step S406, the first wireless communication module 108 transmits the connection confirmation password and a first selection to the server 102. The first selection is that the first mobile device 104 is chosen to be the leas device.

Later, in the step S408, the first wireless communication module 108 transmits the first identification datum 166 inputted in the setting window to the server wireless communication module 112. In addition to the information inputted in the step S402, the first identification datum 166 can further include the communication number of the first wireless communication module 108. When the first wireless communication module 108 transmits the first identification datum, the communication number of the first wireless communication module 108 is transmitted to the server wireless communication module 112 as well.

Subsequently, in the step S410, the second process unit 130 of the second mobile device 106 opens the setting window 146. Because the second mobile device 106 follows the lead device, a user, such as the driver of the second vehicle C2, Mary, sets the second mobile device 106 as the following device and inputs the second identification datum 168. For example, the second identification datum 168 includes the license plate number of the second vehicle C2, the name of the driver of the second vehicle C2, the group name, the identification name and the identification number (not shown in the drawings) of the second vehicle C2.

Thereon, in the step S412, after the user presses the confirm button, the second mobile device 106 logs in the server 102.

Then, in the step S414, the second wireless communication module 110 transmits a second selection to the server 102. The second selection is that the second mobile device is chosen as the following device.

Later, in the step S416, the second wireless communication module 110 transmits the second identification datum 168 to the server 102. In addition to the information inputted in the step S410, the second identification datum 168 can further include the communication number of the second wireless communication module 110. When the second wireless communication module 110 transmits the second identification datum 168, the communication number of the second wireless communication module 110 is transmitted to the server communication module 112 as well.

Afterwards, in the step S418, the server process unit 122 stores the received first identification datum 166, the second identification datum 168, the first selection, the second selection and the connection confirmation password in the server storage unit 120.

Before the first vehicle C1 and the second vehicle C2 hit the road, the first mobile device 104 and the second mobile device 106 finish the above settings for setting the first mobile device 104 and the second mobile device 106 to be in the same group. Accordingly, after the first vehicle C1 and the second vehicle C2 set off for the trip, the first mobile device 104 and the second mobile device 106 can pass the identification confirmation of the server 102. Please refer to FIGS. 6A-6B, which show the flow charts of data transmission between the first mobile device and the second mobile device in FIG. 1.

Figure 6A:
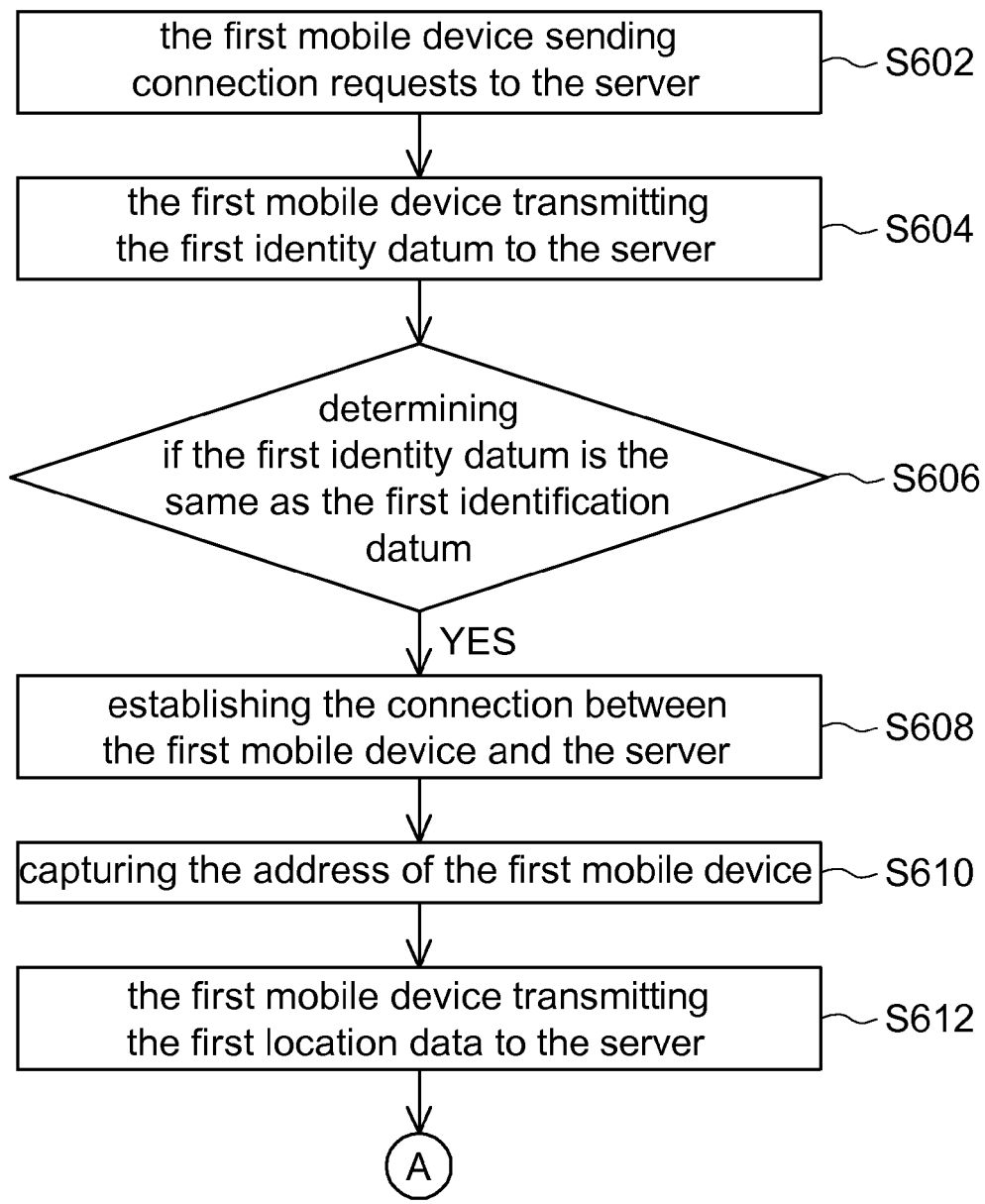
FIGS. 6A-6B show the flow charts of transmitting data between the first mobile device or the second mobile device and the server.

First, as shown in FIG. 6A, the first wireless communication module 108 sends connection requests to the server wireless communication module 112 in the step S602.

Next, in the step S604, the first wireless communication module 108 transmits a first identity datum, such as the communication number of the first wireless communication module 108 to the server wireless communication module 112. Furthermore, the first identity datum can be the license plate number of the first vehicle C1, the name of the driver of the first vehicle C1, the identification name, the group name and the identification number of the driver of the first vehicle C1. Preferably, the data are unique identification information, such as license plate number, identification number or contact number, for avoiding the intrusion of unknown devices.

Then, in the step S606, the server process unit 122 determines if the first identity datum is the same as the first identification datum 166. For example, the first identification datum 166 stored in the server storage unit 120 includes the first identity datum, that is the communication number of the first wireless communication module 108. It is determined that the first identity datum is the same as the first identification datum 166.

Thereon, in the step S608, when the first identity datum is the same as the first identification datum 166, it means that the first mobile device 104 belongs to the same group. Afterwards, the connection between the first mobile device 104 and the server 102 is established through the first wireless communication module 108 and the server wireless communication module 112.

Later, in the step S610, the address of the first mobile device 104 is captured. For example, the address can be the port number of the internet protocol (IP).

Subsequently, in the step S612, the first wireless communication module 108 transmits the first identification datum 166 and the first location data P1 to the server wireless communication module 112. Preferably but not exclusively, the first wireless communication module 108 further transmits a first speed value (not shown in the drawings) of the first vehicle C1 to the server wireless communication module 112. The first speed value can be calculated by the first navigation module 126 according to the first location data P1.

When the server wireless communication module 112 receives the first location data P1, the server process unit 122 can store the latest first location data P1 in the real-time database 138. In other words, the real-time database 138 keeps the latest first location data P1. For example, when the server wireless communication module 112 receives the first location data P1(n) at the time t1(n), the first location data P1(n) are stored in the real-time database 138. When the next first location data P1(n+1) is received at the time t1(n+1), the first location data P1(n) stored in the real-time database 138 is moved to the historical databases 40, and the first location data P1(n+1) is stored in the real-time database to overwrite the first location data P1(n). In other words, the real-time database 138 stores the latest first location data P1.

Moreover, before the first location data P1 are stored in the real-time database 138 and the historical database 140, the server process unit 122 can convert the first location data P1 to the compatible format of the real-time database 138 and the historical database 140. For example, the real-time database 130 and the historical database 140 are MySQL database systems. The server process unit 122 converts the first location data P1 to the compatible format of the MySQL database system. Then, the first location data P1 are stored in the real-time database 130 and the historical database 140.

Figure 6B:
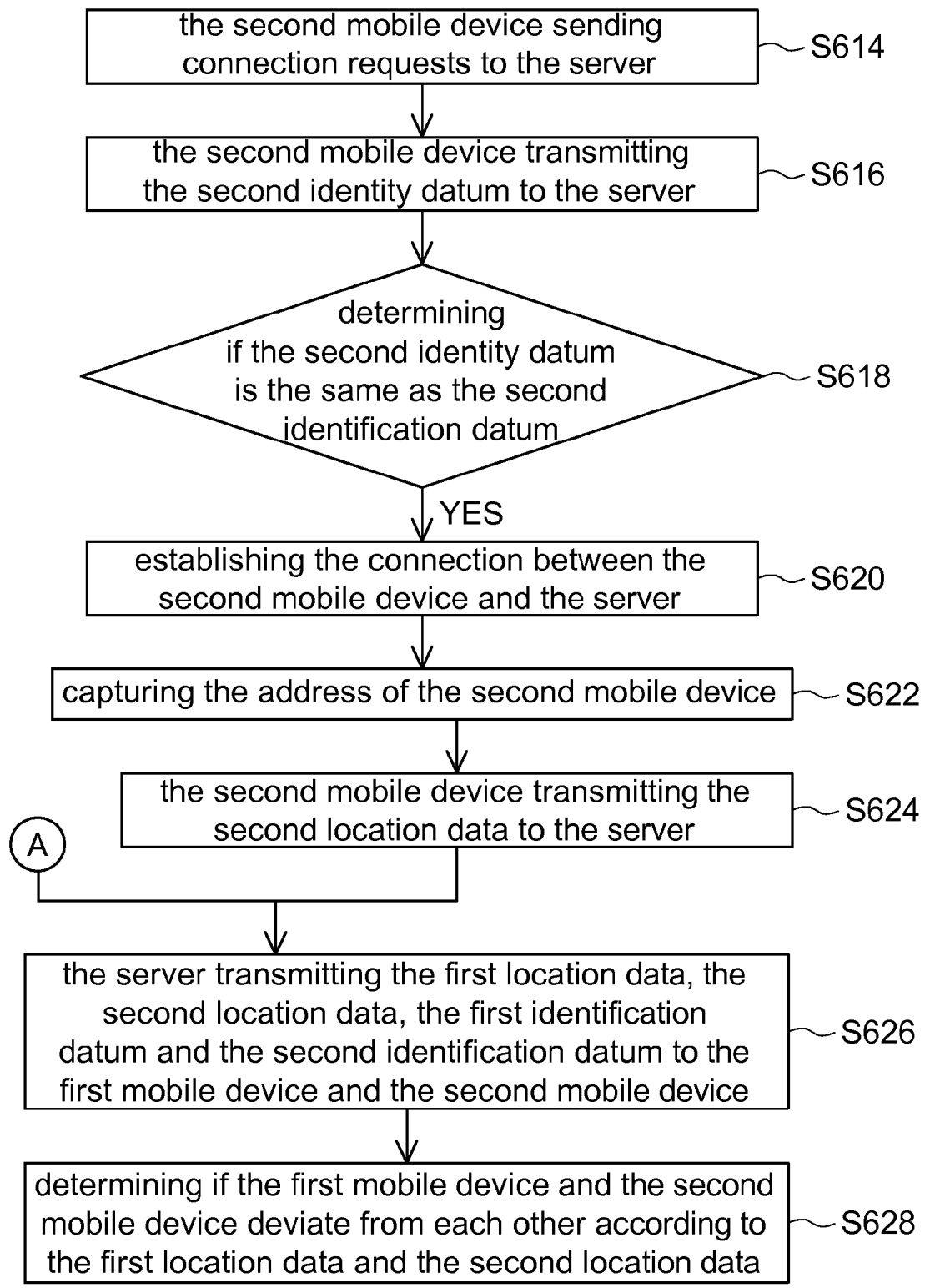

Then, as shown in FIG. 6B, the second wireless communication module 110 sends connection requests to the server wireless communication module 112 in the step S614.

Afterwards, in the step S616, the second wireless communication module 110 transmits a second identity datum, such as the communication number of the second mobile device 106, to the server wireless communication module 112. Besides, the second identity datum can be the license plate number of the second vehicle C2, the name of the driver of the second vehicle C2, the group name, the identification name and the identification number of the driver of the second vehicle C2. Preferably, the second identity datum is unique identification information, such as license plate number, identification number or contact number, for avoiding the intrusion of unknown devices.

Then, in the step S618, the server process unit 122 determines if the second identity datum is the same as the second identification datum 168. For example, when the second identification datum 168 stored in the server storage unit 120 includes the second identity datum, that is the communication number of the second wireless communication module 110, it is determined that the second identification datum is the same as the second identification datum 168.

Thereon, in the step S620, when the second identity datum is the same as the second identification datum 168, the second mobile device 106 belongs to the same group. Afterwards, the connection between the second mobile device 106 and the server 102 is established through the second wireless communication module 110 and the server wireless communication module 112.

Later, in the step S622, the address of the second mobile device 106 is captured. For example, the address can be the port number of the internet protocol (IP).

Subsequently, in the step S624, the second wireless communication module 110 transmits the second identification datum 168 and the second location data P2 to the server wireless communication module 112. Preferably but not exclusively, the second wireless communication module 110 further transmits a second speed value (not shown in the drawings) of the second vehicle C2 to the server wireless communication module 112. The second speed value can be calculated by the second navigation module 162 according to the second location data P2.

When the server wireless communication module 112 receives the second location data P2, the server process unit 122 can store the latest second location data P2 in the real-time database 138. In other words, the real-time database 138 keeps the latest second location data P2. For example, when the server wireless communication module 112 receives the second location data P2(n) at the time t2(n), the second location data P2(n) are stored in the real-time database 138. When the next second location data P2(n+1) are received at the time t2(n+1), the second location data P2(n) stored in the real-time database 138 are moved to the historical database 140, and the second location data P2(n+1) are stored in the real-time database to overwrite the second location data P2(n). In other words, the real-time database 138 stores the latest second location data P2. Moreover, before the second location data P2 are stored in the real-time database 138 and the historical database 140, the server process unit 122 can convert the second location data P2 to the compatible format of the real-time database 138 and the historical database 140. For example, the real-time database 130 and the historical database 140 are MySQL database systems.

Afterwards, in the step S626, the server wireless communication module 112 transmits the first location data P1 and the second location data P2 stored in the real-time database 138, the first identification datum 166 and the second identification datum 168 to the first mobile device 104 and the second mobile device 106.

Then, in the step S628, it is determined if the first mobile device 104 and the second mobile device 106 deviate from each other according to the first location data P1 and the second location data P2.

The present embodiment has several methods to determine if the first mobile device 104 and the second mobile device 106 deviate from each other in the step S628. Several methods are described as follows as examples.

Figure 7:
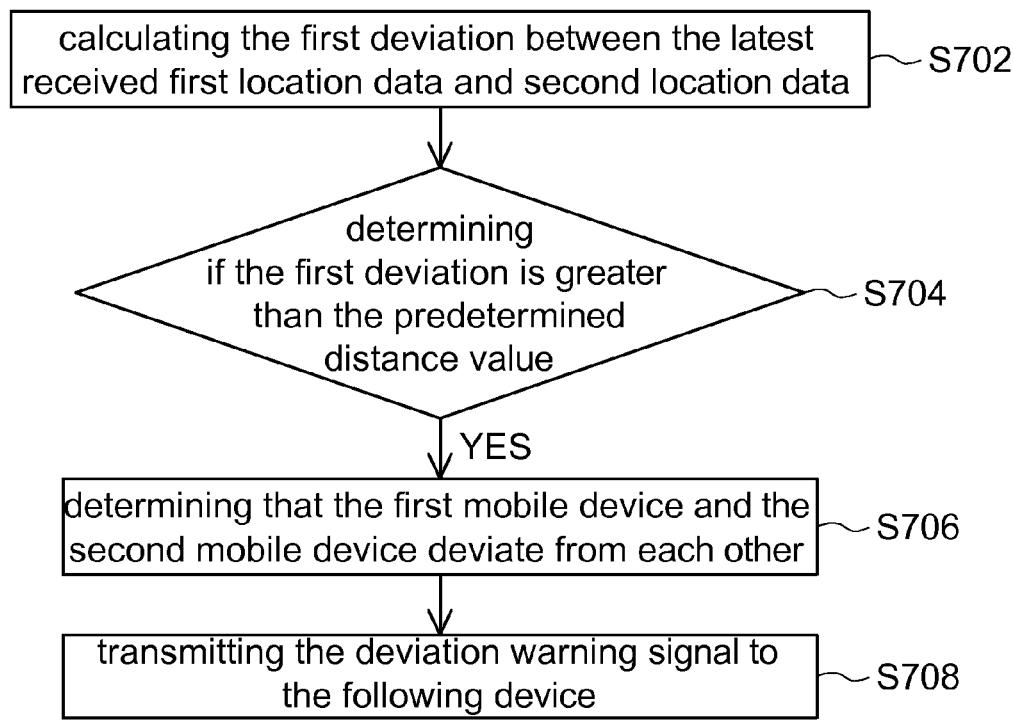
FIG. 7 shows a flow chart of the first method for determining the deviation of dynamic location in the step S628.

Please refer to FIG. 7, which shows a flow chart of the method for determining the deviation of dynamic location. In the step S702, the server process unit 122 calculates a first deviation between the first location data P1 and the second location data P2 according to the information in the real-time database 138 or the historical database 140.

Thereon, in the step S704, the server process unit 122 determines if the first deviation is greater than a predetermined distance value, such as 1 km.

Subsequently, in the step S706, when the first deviation is greater than 1 km, the server process unit 122 determines that the first mobile device 104 and the second mobile device 106 deviate from each other.

Afterwards, in the step S708, when the first mobile device 104 and the second mobile device 106 deviate from each other, the server process unit 122 controls the server wireless communication module 112 to transmit a deviation warning signal to the following device, that is the second mobile device 106, and displays the deviation warning signal in the message window 164, for reminding that the second mobile device 106 might deviate from the route of the lead device. For example, the deviation warning signal is "Mary and John are apart by 1.2 km."

Figure 8:
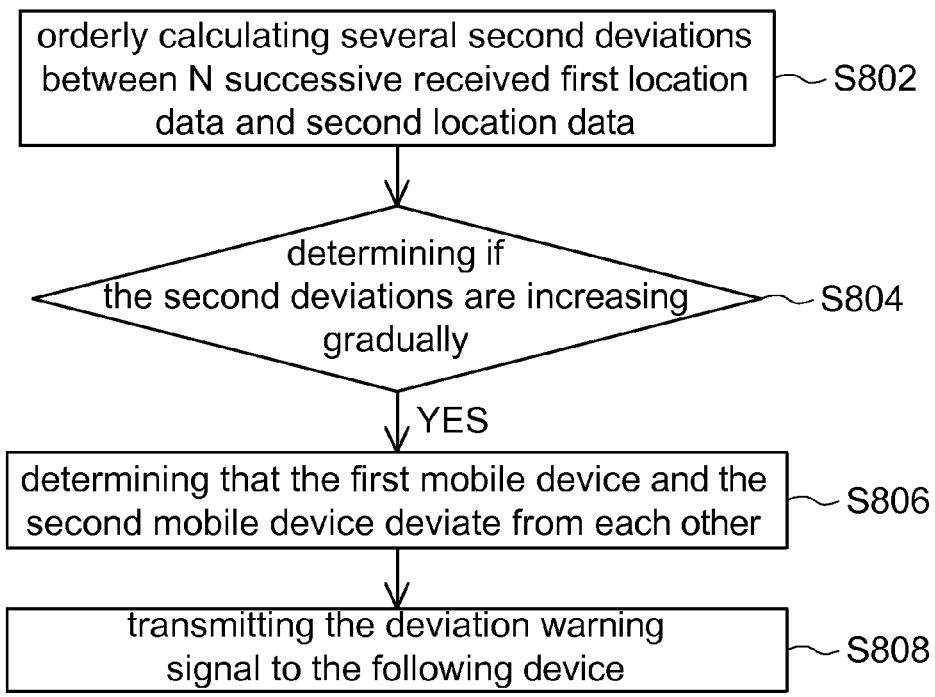
FIG. 8 shows a flow chart of the second method for determining deviation in the step S628 in FIG. 6B.

Please refer to FIG. 8, which shows the flow chart of the second method for determining deviation in the step S628 in FIG. 6B. In the step S802, the server process unit 122 calculates the second deviation between five successive first location data P1 and second location data P2 according to the location data in the real-time database 138 and the historical database 140. The server process unit 122 determines if the first mobile device 104 and the second mobile device 106 deviate from each other according to the second deviations.

Figure 9:
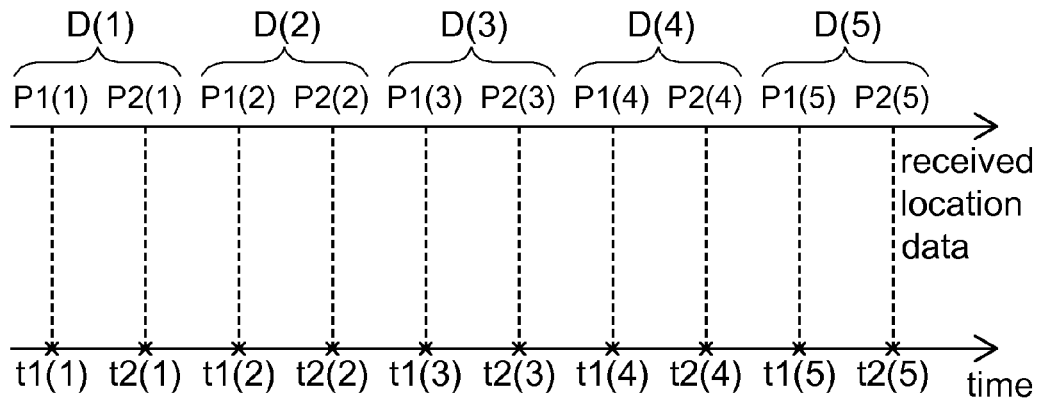
FIG. 9 illustrates the sequence diagram of five successive first location data and second location data of the present embodiment.

Please refer to FIG. 9 at the same time, which illustrates the sequence diagram of five successive first location data and second location data. More specifically, the server wireless communication module 112 sequentially receives the first location data P1(1), P1(2), P1(3), P1(4) and P1(5) and the second location data P2(1), P2(2), P2(3), P2(4) and P2(5). The first location data P1(m) and the second location data P2(m) are received almost synchronically. m is equal to 1 to 5. When the server process unit 122 receives the first location data P1(1) and the second location data P2(1), the second deviation D(1) between the first location data P1(1) and the second location data P2(1) is calculated. When the next first location data P1(2) and the second location data P2(2) are received, the second deviation D(2) between the first location data P1(2) and the second location data P2(2) is calculated. Similar calculation is performed until the second deviation D(5) between the first location data P1(5) and the second location data P2(5) is calculated.

Then, in the step S804, the server process unit 122 determines if the second deviations D are increasing. More specifically, when the second deviation D(m+1) is greater than the second deviation D(m), it is determined that the second deviations D are increasing.

Afterwards, in the step S806, when the second deviations D are increasing gradually, the server process unit 122 determines that the first mobile device 104 and the second mobile device 106 deviate from each other.

Next, in the step S808, when the first mobile 104 and the second mobile device 106 deviate from each other, the server wireless communication module 112 transmits the deviation warning signal to the following device, that is the second mobile device 106, for reminding that the second mobile device 106 might deviate from the route of the lead device.

Figure 10:
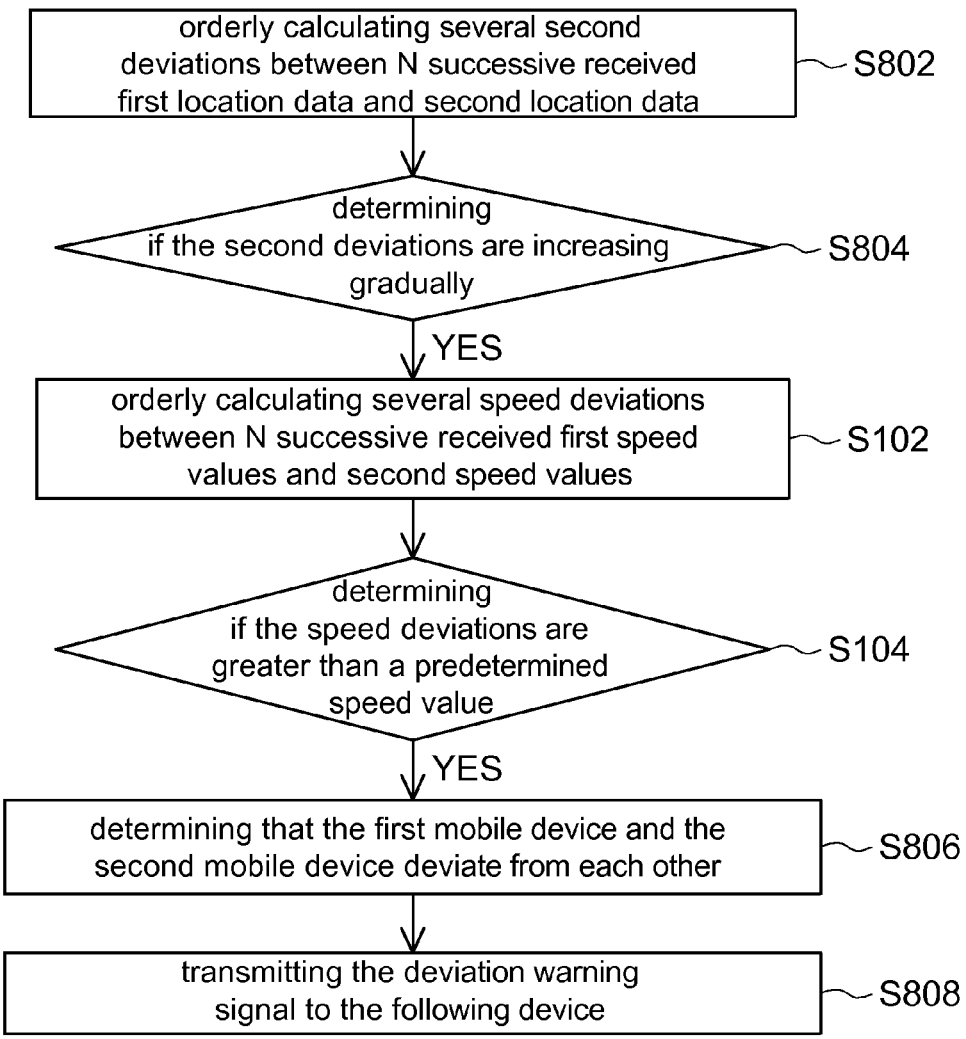
FIG. 10 shows a flow chart of the third method for determining the deviation in the step S628 in FIG. 6B.

Please refer to FIG. 10, which shows a flow chart of the third method for determining the deviation in the step S628 in FIG. 6B. The steps S802 and S804 are illustrated in FIG. 8 and therefore not described repeatedly.

Figure 11:
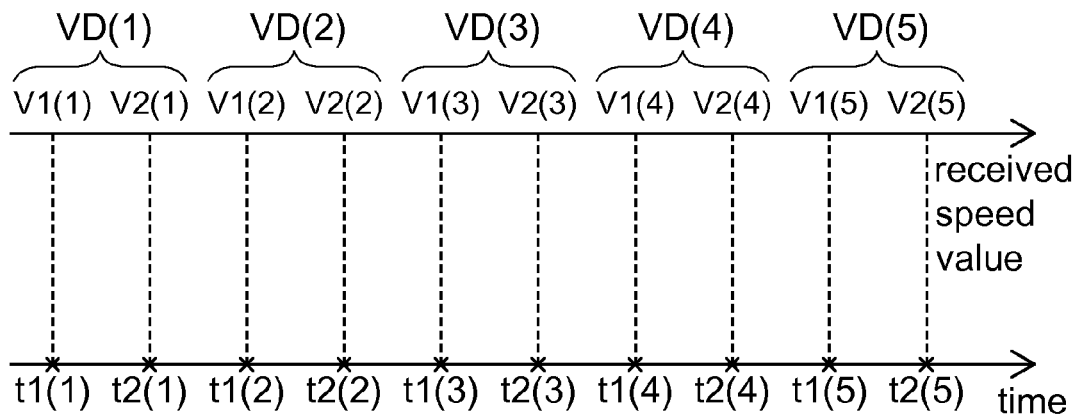
FIG. 11 shows the sequence diagram of received five successive first speed values and second speed values of the present embodiment.

In the step S102, the server process unit 122 calculates the speed deviation between N successive first speed values and second speed values sequentially. Please refer to FIG. 11 at the same time, which shows the sequence diagram of received five successive first speed values and second speed values. More specifically speaking, the server wireless communication module 112 receives the first speed values V1(1), V1(2), V1(3), V1(4) and V1(5) sequentially and receives the second speed values V2(1), V2(2), V2(3), V2(4) and V2(5) sequentially. The first speed value V1(m) and the second speed value V2(m) are received almost synchronically. m is equal to 1 to 5. When the server process unit 122 receives the first speed V1(1) and the second speed V2(1), the speed deviation between the first speed value V1(1) and the second speed V2(1) is calculated. When the server process unit 122 receives the first speed V1(2) and the second speed V2(2), the speed deviation between the first speed value V1(2) and the second speed V2(2) is calculated. The process keeps going until the speed deviation between the first speed value V1(5) and the second speed V2(5) is calculated.

Later, in the step S104, the server process unit 122 determines if the speed deviation VD is greater than a predetermined speed value, such as 3 km/hr.

Then, in the step S806, when the second deviations D are increasing gradually and each of the speed deviation VD is greater than the predetermined value, the server process unit 122 determines that the first mobile device 104 and the second mobile device 106 deviate from each other.

The following step S808 in FIG. 10 is described in FIG. 8 and therefore not described repeatedly.

Figure 12:
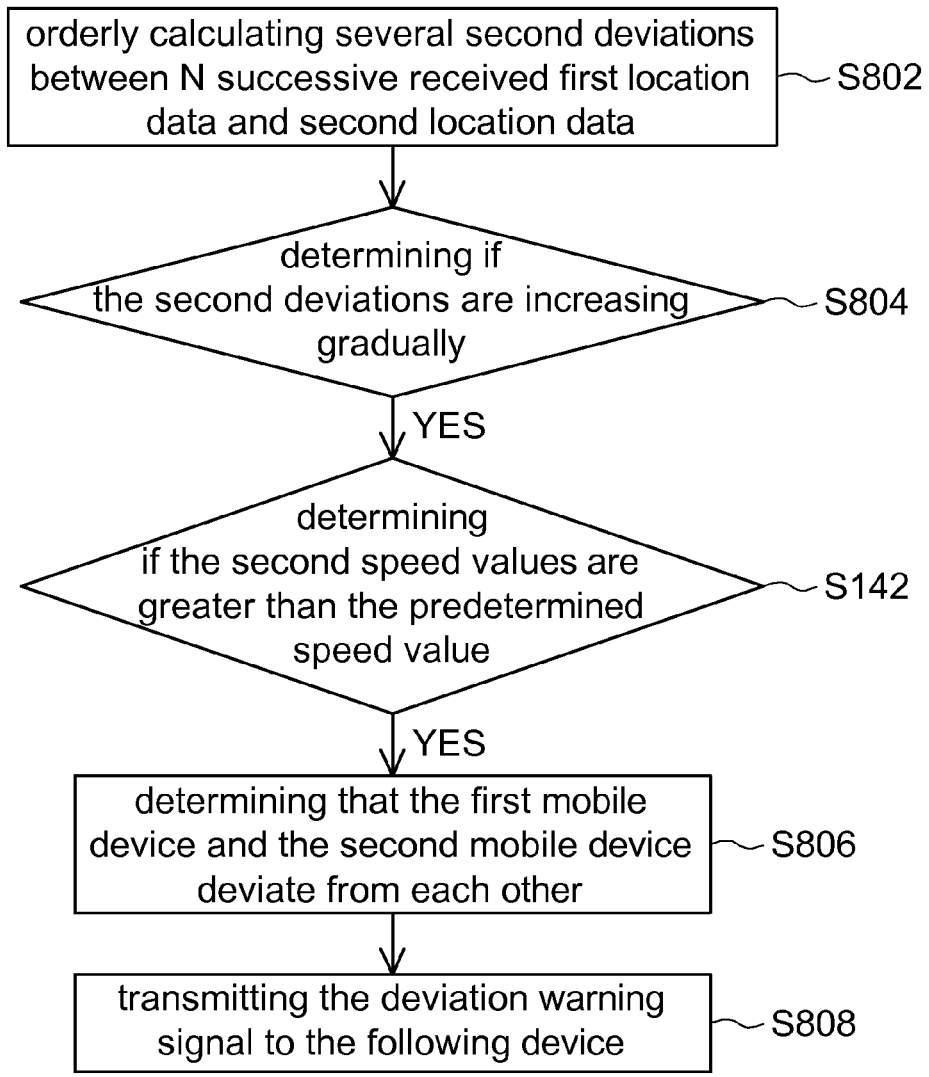
FIG. 12 shows a flow chart of the fourth method for determining the deviation in the step S628 in FIG. 6B.

Please refer to FIG. 12, which shows a flow chart of the fourth method for determining the deviation in the step S628 in FIG. 6B. The steps S802 and S804 are described in FIG. 8 and therefore not described redundantly.

In the step S142, the server process unit 122 determines if the second speed value of the second mobile device 106 is greater than a predetermined speed value, such as 3 km/hr. When the second speed value is less than 3 km/hr, it means that the second vehicle C2 is waiting at traffic light and does not deviate from the first vehicle C1.

Next, in the step S806, when the second deviations D are gradually increasing and the second speed values are greater than the predetermined speed value, the server process unit 122 determines that the first mobile device 104 and the second mobile device 106 deviate from each other.

The following step S808 in FIG. 12 is described in FIG. 8 and therefore not described repeatedly.

Furthermore, after the server 102 of the present embodiment determines the deviation, the deviation warning signal is transmitted to the following device. However, in other modes, when the following device deviates from the lead device, the navigation module of the following device calculates the route back to the group between the first mobile device 104 and the second mobile device 106 according to the latest first location data P1 and the second location data P2, for guiding the following device back to the group.

Please refer to FIG. 2 at the same time. The operator of the second mobile device 106, such as the driver of the second vehicle C2, presses the start calculation button 165 to calculate the route, or presses the automatic calculation button 167 to perform multi-route calculation. The second navigation module 162 (shown in FIG. 1) of the second mobile device 106 sets the latest first location data P1 as the destination and the latest second location data P2 as the origin and calculates the route between origin and destination for getting back to the group. More specifically speaking, when the driver of the second vehicle C2 presses the start calculation button 165, the second navigation module 162 only calculates a single route from the latest first location data P1 to the latest second location data P2. When the driver of the second vehicle C2 presses the automatic calculation button 167, the second navigation module 162 keeps calculating the route according to the latest first location data P1 and the latest second location data P2 until the deviation warning signal disappears.

Second Embodiment

Figure 13:
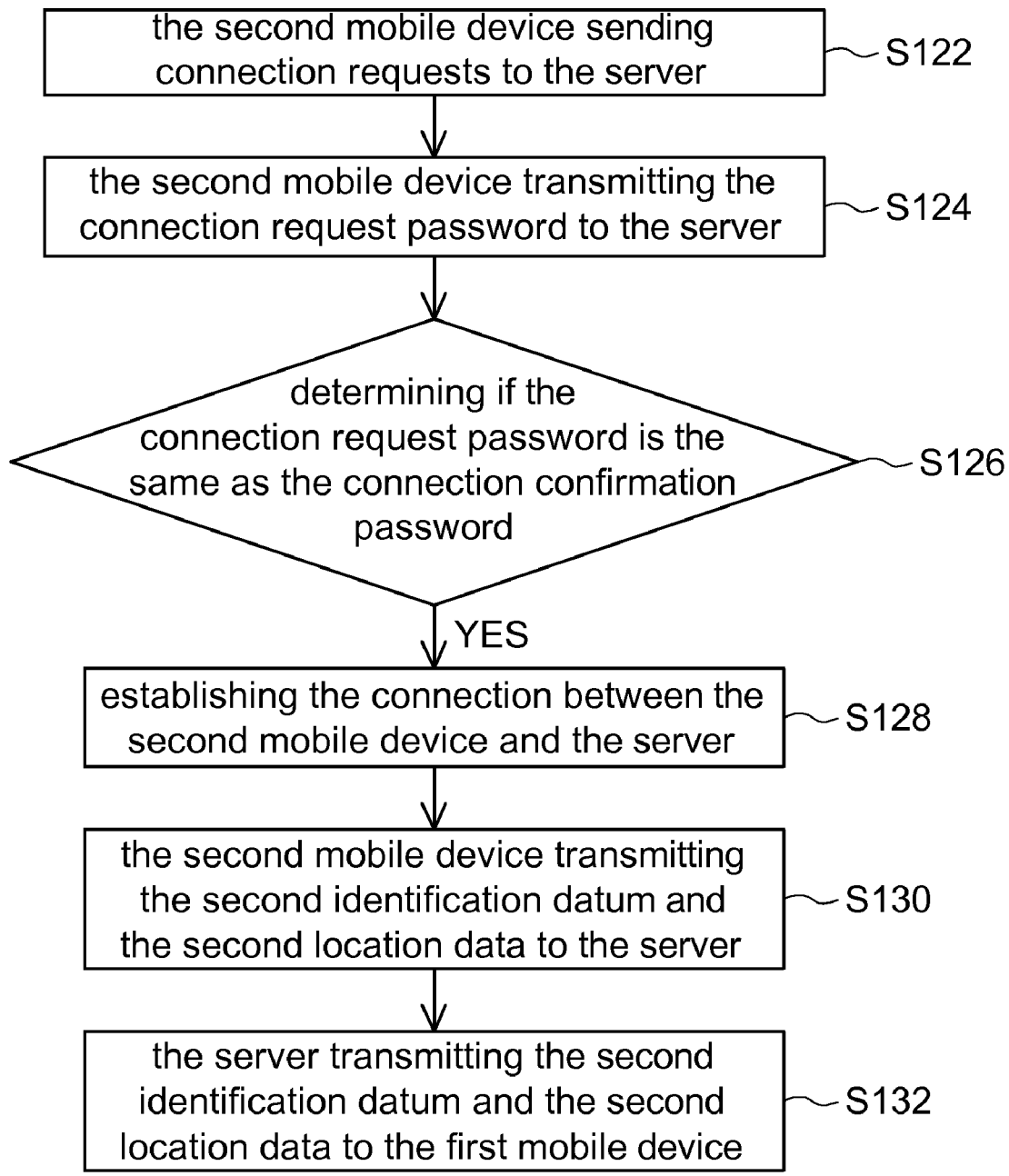
FIG. 13 shows a flow chart of adding a foreign device into the group of the present invention.

Please refer to FIG. 13, which shows a flow chart of adding a unknown device into the group of the present invention. The same parts of the present embodiment as the first embodiment use the same reference numbers and are not described redundantly. The difference between the second embodiment and the first embodiment is that the second mobile device 106 does not perform the setting steps in FIG. 4. However, the second mobile device 106 of the second embodiment still can join the car-following group after passing the password verification under the same group name, which is illustrated as follows.

First, in the step S122, the second wireless communication module 110 sends connection requests to the server wireless communication module 112.

Next, in the step S124, the second wireless communication module 110 transmits a connection request password to the server wireless communication module 112. For example, the connection request password is manually inputted by the driver of the second vehicle C2.

Then, in the step S126, the server process unit 122 determines if the connection request password is the same as the connection confirmation password.

Afterwards, in the step S128, when the connection request password is the same as the connection confirmation password, the connection between the second mobile device 106 and the server 102 is established.

Thereon, in the step S130, the second wireless communication module 110 transmits the second identification datum, such as the license plate number of the second vehicle C2, the name of the driver of the second vehicle C2, the name of the group, the identification name and the identification number of the driver of the second vehicle C2, and the second location data P2 to the server wireless communication module 112.

Subsequently, in the step S132, the server wireless communication module 112 transmits the second identification datum and the second location data P2 to the first mobile device 104.

More specifically speaking, when a mobile device which does not perform the setting in FIG. 2 sends connection requests to the server, the server regards the mobile device as an unknown device. The unknown device of the second embodiment, that is the second mobile device 106, is connected with the server through password verification. After the unknown device is connected with the server, the data of the second mobile device 106 and the server 102 can be sent to each other.

Third Embodiment

Figure 14:
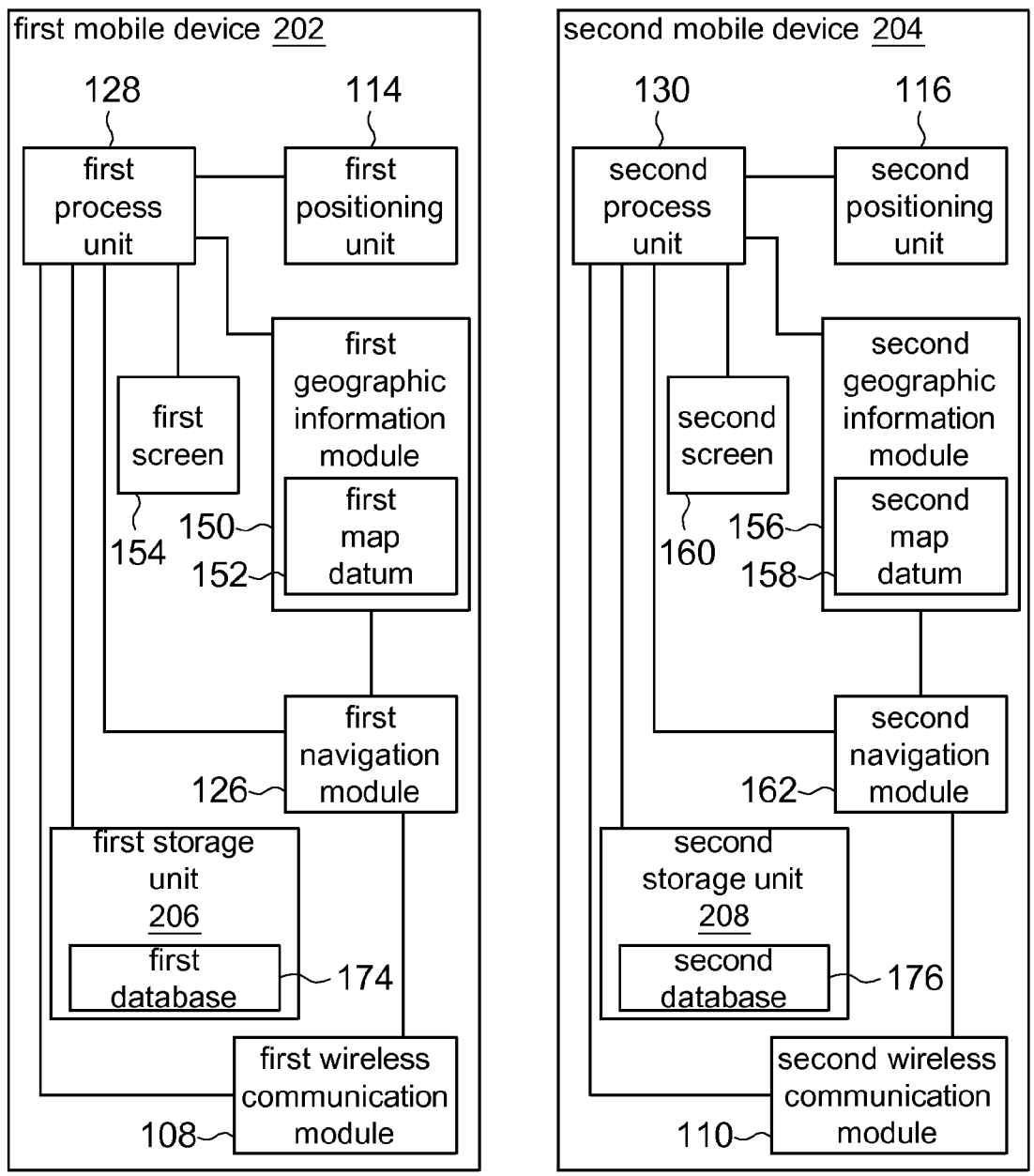
FIG. 14 illustrates the function block diagram of the first mobile device and the second mobile device according to the third embodiment of the present invention.

Please refer to FIG. 14, which illustrates the function block diagram of the first mobile device and the second mobile device according to the third embodiment of the present invention. The difference between the third embodiment and the first embodiment is that the first mobile device 202 of the third embodiment further includes a first storage unit 206, and the second mobile device 204 further includes a second storage unit 208.

The first storage unit 206 includes a first database 174 for storing the first location data P1 and the second location data P2. The first location data P1 can be transmitted by the server 102. Or, the first process unit 128 captures the first location data P1 calculated by the first positioning unit 114 and stores the first location data P1 in the first database 174. The second location data P2 are provided by the server 102. The second storage unit 208 includes a second database 176 for storing the first location data P1 and the second location data P2. The second location data P2 can be transmitted from the server 102. Or, the second process unit 130 captures the second location data P2 calculated by the second positioning unit 116 and stores captures the second location data P2 in the second database 176. The first location data P1 are provided by the server 102.

Accordingly, the first mobile device 104 stores both the first location data P1 and the second location data P2. The first mobile device 104 is able to get the latest dynamic locations of the first vehicle C1 and the second vehicle C2. Also, the first process unit 128 determines if the first mobile device 104 and the second mobile device 106 deviate from each other according to the data in the first database 174 and the art disclosed in FIG. 7, FIG. 8, FIG. 10 or FIG. 12. Similarly, the second mobile device 106 can store both the first location data P1 and the second location data P2. Also, the second mobile device 106 can determine if the first mobile device 104 and the second mobile device 106 deviate from each other according to the art disclosed in FIG. 7, FIG. 8, FIG. 10 and FIG. 12.

Accordingly, when the first mobile device 202 and the second mobile device 204 are chosen to be the lead device and the following device respectively, and the first mobile device 202 and the second mobile device 204 deviate from each other, the first process unit 128 controls the first wireless communication module 108 to transmit the deviation warning signal to the second mobile device 204 for reminding that the following device might deviate from the lead device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining the dynamic location deviation, the method comprising:

a server receiving a plurality of first location data of a first mobile device;

the server receiving a plurality of second location data of a second mobile device;
the server transmitting the first location data to the second mobile device;
the server transmitting the second location data to the first mobile device; and
determining if the first mobile device and the second mobile device deviate from each other according to the first location data and the second location data.

2. The method according to claim 1 further comprising:
calculating each of the first location data according to a plurality of signals of a positioning device; and
calculating each of the second location data according to the signals of the positioning device.

3. The method according to claim 2, wherein the positioning devices are global positioning system (GPS) satellites or wireless communication base stations.

4. The method according to claim 1 further comprising:
providing a lead device option and a following device option, for choosing the first mobile device and the second mobile device as a lead device or a following device;
the first mobile device logging in the server;
the first mobile device transmitting a first selection to the server, the first selection being that the first mobile device is chosen as the lead device or the following device;
the first mobile device transmitting a first identification datum to the server;
the second mobile device logging in the server;
the second mobile device transmitting a second selection to the server, the second selection being that the second mobile device is chosen to be the lead device or the following device;
the second mobile device transmitting a second identification datum to the server; and
storing the first identification datum, the second identification datum, the first selection and the second selection in the server.

5. The method according to claim 4, wherein the first identification datum and the second identification datum comprise license plate number, name of person, identification name, mobile phone number, identification number, group name or communication number of wireless communication module.

6. The method according to claim 4 further comprising following steps before the server receives the first location data:
the first mobile device sending connection requests to the server;
the first mobile device transmitting a first identity datum to the server;
determining if the first identity datum is the same as the first identification datum;
establishing the connection between the first mobile device and the server when the first identity datum is the same as the first identification datum;
wherein the method further comprises following steps before the server receives the second location data:
the second mobile device sending connection requests to the server;
the second mobile device transmitting a second identity datum to the server;
determining if the second identity datum is the same as the second identification datum;
establishing the connection between the second mobile device and the server when the second identity datum is the same as the second identification datum.

7. The method according to claim 4, wherein in the selection step, the first selection is that the first mobile device is chosen to be the lead device, and the second mobile device is chosen to be the following device, and the determining method further comprises:
transmitting a deviation warning signal to the second mobile device when the first mobile device and the second mobile device deviate from each other.

8. The method according to claim 4, wherein in the selection step, the first selection is that the first mobile device is chosen as the lead device, and the second selection is that the second mobile device is chosen to be the following device, and the step of determining deviation further comprises:
calculating a rejoining route between the first mobile device and the second mobile device according to the latest first location data and second location data.

9. The method according to claim 4, wherein in the selection step, the first selection is that the first mobile device is chosen to be the lead device, and the second selection is that the second mobile device is chosen to be the following device, and the step of determining deviation comprises:
setting the latest first location data to be a destination;
setting the latest second location data to be an origin; and
the second mobile device calculating a rejoining route between the origin and the destination.

10. The method according to claim 4, wherein in the selection step, the first selection is that the first mobile device is chosen to be the lead device, the second selection is that the second mobile device is chosen to be the following device, the server is further used for receiving a plurality of first speed values of the first mobile device and a plurality of second speed values of the second mobile device, the server further transmits the received first speed values to the second mobile device and transmits the received second speed values to the first mobile device, and the step of determining deviation further comprises:
orderly calculating a plurality of second deviations between N successive received first location data and second location data, wherein N is an integer not less than 2;
determining if the second deviations are increasing gradually;
determining if the second speed values are greater than a predetermined value; and
determining that the first mobile device and the second mobile device deviate from each other when the second deviations are increasing gradually and the second speed values are greater than the predetermined speed value.

11. The method according to claim 1 further comprising:
the first mobile device transmitting a first identification datum to the server;
the second mobile device transmitting a second identification datum to the server;
the server transmitting the received first identification datum to the second mobile device; and
the server transmitting the received second identification datum to the first mobile device.

12. The method according to claim 1 further comprising:
transmitting a connection confirmation password; and
storing the connection confirmation password in the server.

13. The method according to claim 12 further comprising:
the first mobile device and the second mobile device sending connection requests to the server;
the first mobile device and the second mobile device sending a connection request password to the server;
determining if the connection request password is the same as the connection confirmation password; and establishing the connection between the first mobile device, the second mobile device and the server when the connection request password is the same as the connection confirmation password.

14. The method according to claim 1 further comprising following steps after the server receives the first location data:
storing the latest first location data and second location data in a real-time database and overwriting the content of the real-time database; and
storing the first location data and the second location data in a historical database according to the sequence of the first location data and the second location data.

15. The method according to claim 1, wherein the step of the server transmitting the second location data comprises:
transmitting the second location data to the first mobile device according to the sequence of the second location data;
the determining method further comprising:
providing a first map datum; and
positioning the latest first location data and second location data in the first map datum.

16. The method according to claim 1, wherein the step of the server transmitting the first location data comprises:
transmitting the first location data to the second mobile device according to the sequence of the first location data;
the determining method further comprising:
providing a second map datum; and
positioning the latest first location data and the second location data in the second map datum.

17. The system according to claim 16, wherein the first mobile device further comprises:
a first storage unit, for storing the first location data and the second location data.

18. The method according to claim 1, wherein the step of determining the deviation further comprises:
calculating a first deviation between the latest received first location data and the second location data;
determining if the first deviation is greater than a predetermined value; and
determining that the first mobile device and the second mobile device deviate from each other when the first deviation is greater than the predetermined value.

19. The method according to claim 1, wherein the step of determining the deviation comprises:
orderly calculating a plurality of second deviations between the N successive received first location data and second location data, wherein N is an integer not less than 2;
determining if the second deviations are increasing gradually; and
determining that the first mobile device and the second mobile device deviate from each other when the second deviations are increasing gradually.

20. The method according to claim 19, wherein the server is also used for receiving a plurality of first speed values of the first mobile device and a plurality of second speed values of the second mobile device, the server further transmitting the received first speed values to the second mobile device and transmitting the received second speed values to the first mobile device, and the step of determining deviation further comprises:
orderly calculating a plurality of speed deviations between the first speed values and the second speed values;
determining if the speed deviations are greater than a predetermined speed value; and
determining that the first mobile device and the second mobile device deviate from each other when the second deviations are increasing gradually.

21. The method according to claim 1 further comprising:
determining if a disconnecting time between the server and one of the first mobile device and the second mobile device is longer than a predetermined time; and
the server transmitting a disconnection notice signal to another of the first mobile device and the second mobile device, which is still connected to the server.

22. A system for determining deviation of dynamic location, the system comprising:
a server, comprising a server wireless communication module and a server process unit;
a first mobile device, comprising a first wireless communication module and a first process unit, the first wireless communication module used for transmitting a plurality of first location data to the server wireless communication module; and
a second mobile device, comprising a second wireless communication module and a second process unit, the second wireless communication module used for transmitting a plurality of second location data to the server wireless communication module;
wherein the server wireless communication module used for transmitting the received first location data to the second mobile device and transmitting the received second location data to the first mobile device;
wherein at least one of the server process unit, the first process unit and the second process unit is used for determining if the first mobile device and the second mobile device deviate from each other according to the first location data and the second location data.

23. The system according to claim 22, wherein the first mobile device further comprises:
a first positioning unit, for calculating the first location data according to signals of a plurality of positioning devices;
wherein the second mobile device further comprises:
a second positioning unit, for calculating the second location data according to the signals of the positioning devices.

24. The system according to claim 23, wherein the positioning devices are global positioning system (GPS) satellites or wireless communication base stations.

25. The system according to claim 22, wherein the first mobile device and the second mobile device provide a lead device option and a following device option, so that the first mobile device and the second mobile device are chosen to be the lead device or the following device, the server further used for storing a first identification datum of the first mobile device, a second identification datum of the second mobile device, a first selection and a second selection;
wherein the first selection is that the first mobile device is chosen to be the lead device or the following device, and the second selection is that the second mobile device is chosen to be the lead device or the following device.

26. The system according to claim 25, wherein the first identification datum and the second identification datum comprise license plate number, name of person, identification name, identification number, group name or communication number of wireless communication module.

27. The system according to claim 25, wherein the first wireless communication module is further used for sending connection requests to the server wireless communication module and for transmitting a first identity datum to the server communication module, the second wireless communication module is further used for sending connection requests to the server wireless communication module and for transmitting a second identity datum to the server communication module, and the server process unit is further used for determining if the first identity datum is the same as the first identification datum and for determining if the second identity datum is the same as the second identification datum.

28. The system according to claim 25, wherein the first selection is that the first mobile device is chosen to be the lead device, and the second selection is that the second mobile device is chosen to be the following device, at least one of the server process unit, the first process unit and the second process unit is further used for transmitting a deviation warning signal to at least one of the first mobile device and the second mobile device.

29. The system according to claim 25, wherein the first selection is that the first mobile device is chosen to be the lead device, the second selection is that the second mobile device is chosen to be the following device, and the second mobile device further comprises:
a second navigation module, used for calculating a rejoining route between the latest received first location data and second location data when the first mobile device and the second mobile device deviate from each other.

30. The system according to claim 25, wherein the first selection is that the first mobile device is chosen to be the lead device, the second selection is that the second mobile device is chosen to be the following device, and the second mobile device further comprises:
a second navigation module, for setting the latest first location data to be a destination and setting the latest second location data to be an origin and calculating a rejoining route between the origin and destination.

31. The system according to claim 25, wherein the first selection is that the first mobile device is chosen to be the lead device, the second selection is that the second mobile device is chosen to be the following device, the server wireless communication module is further used for receiving a plurality of first speed values of the first mobile device and a plurality of second speed values of the second mobile device, the server wireless communication module is further used for transmitting the first speed values to the second mobile device and transmitting the second speed values to the first mobile device;
wherein at least one of the server process unit, the first process unit and the second process unit is further used for orderly calculating a plurality of second deviations between N successive first location data and second location data and for determining if the second deviations are increasing gradually, wherein N is an integer not less than 2, the at least one of the server process unit, the first process unit and the second process unit is used for determining if each of the second speed value is greater than a predetermined speed value, and the at least one of the server process unit, the first process unit and the second process unit determines that the first mobile device and the second mobile device deviate from each other when the second deviations are increasing gradually and the second speed values are greater than the predetermined speed value.

32. The system according to claim 22, wherein the first wireless communication module is further used for transmitting a first identification datum to the server wireless communication module, the second wireless communication module is further used for transmitting a second identification datum to the server wireless communication module, the server wireless communication module further transmits the received first identification datum to the second wireless communication module, and the server wireless communication module further transmits the received second identification datum to the first wireless communication module.

33. The system according to claim 22, wherein the first wireless communication module is further used for transmitting a connection confirmation password, and the server is further used for storing the connection confirmation password.

34. The system according to claim 33, wherein the second wireless communication module is further used for sending connection requests to the server wireless communication module and for transmitting a connection request password to the server wireless communication module, the server process unit is further used for determining if the connection request password is the same as the connection confirmation password.

35. The system according to claim 22, wherein the server stores a real-time database and a historical database, the server process unit is further used for storing the latest received first location data and the second location data into the real-time database and overwriting the content of the real-time database and for storing the first location data and the second location data into the historical database according to the sequence of the first location data and the second location data.

36. The system according to claim 22, wherein the first mobile device further comprises:
a first geographic information module, for providing a first map datum; and
a first navigation module, for positioning the latest received second location data on the first map datum.

37. The system according to claim 22, wherein the second mobile device further comprises:
a second geographic information module, for providing a second map datum; and
a second navigation module, for positioning the latest received first location data on the second map datum.

38. The system according to claim 22, wherein at least one of the server process unit, the first process unit and the second process unit is used for calculating a first deviation between the latest received first location data and the second location data, and for determining if the first deviation is greater than a predetermined distance value;
wherein the at least one of the server process unit, the first process unit and the second process unit determines that the first mobile device and the second mobile device deviate from each other when the first deviation is greater than the predetermined value.

39. The system according to claim 22, wherein at least one of the server process unit, the first process unit and the second process unit is further used for calculating a plurality of second deviations between N successive first location data and second location data and for determining if the second deviations are increasing gradually, wherein N is an integer not less than 2;
wherein the at least one of the server process unit, the first process unit and the second process unit determines that the first mobile device and the second mobile device deviate from each other when the second deviations are increasing gradually.

40. The system according to claim 39, wherein the server wireless communication module is further used for receiving a plurality of first speed values of the first mobile device and a plurality of second speed values of the second mobile device, the server wireless communication module is further used for transmitting the first speed values to the second mobile device and transmitting the second speed values to the first mobile device;

wherein at least one of the server process unit, the first process unit and the second process unit is further used for orderly calculating a plurality of speed deviations between the N successive received first speed values and second speed values to determine if each of the speed deviation is greater than a predetermined speed value, the at least one of the server process unit, the first process unit and the second process unit determines that the first mobile device and the second mobile device deviate from each other when the speed deviations are increasing gradually and each of the speed deviations is greater than the predetermined speed value.

41. The system according to claim 22, wherein the server process unit is further used for determining if a disconnecting time between the server and one of the first mobile device and the second mobile device is longer than a predetermined time and for transmitting a disconnection notice signal to another of the first mobile device and the second mobile device, which is still connected, when the disconnecting time is longer than the predetermined time.

42. The system according to claim 22, wherein the second mobile device further comprises:

a second storage unit, for storing the first location data and the second location data.

* * * * *